March 26, 1935.　　　S. L. KISER　　　1,995,308
PLOTTING BOARD
Filed Oct. 8, 1932　　2 Sheets-Sheet 1

INVENTOR.
Sherman L. Kiser
BY
ATTORNEY

March 26, 1935.  S. L. KISER  1,995,308
PLOTTING BOARD
Filed Oct. 8, 1932  2 Sheets-Sheet 2
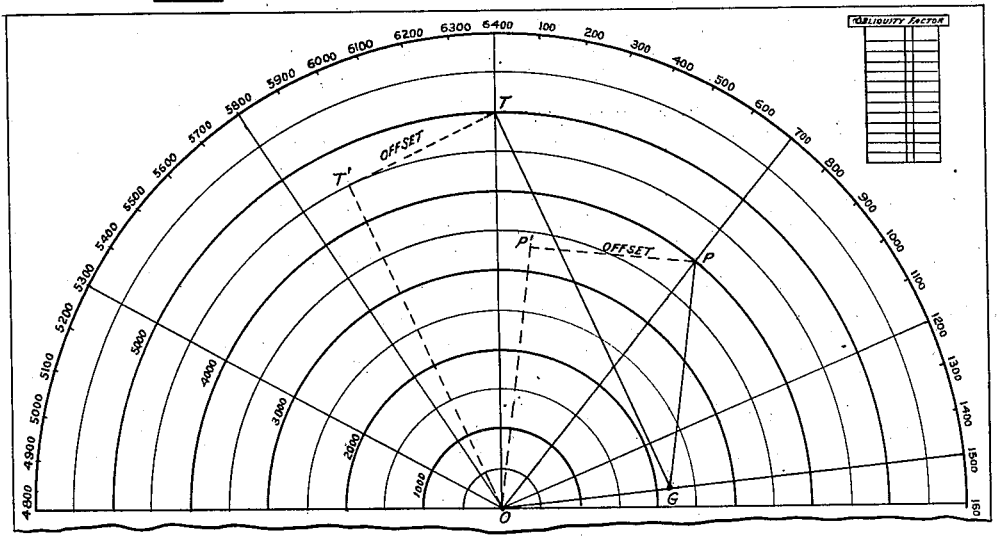
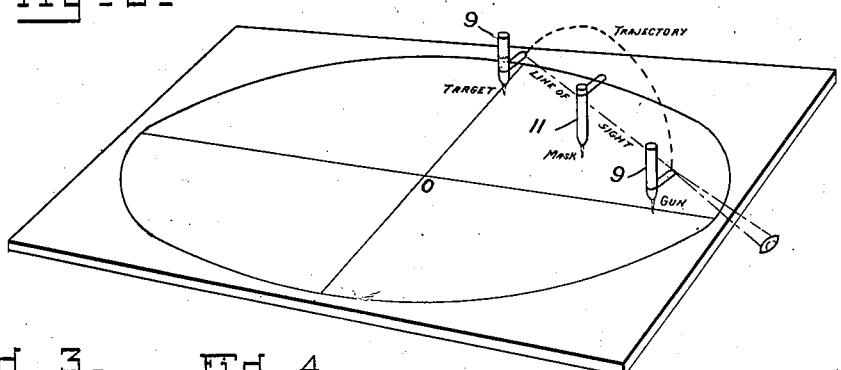
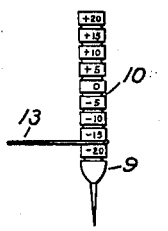
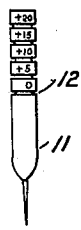
Inventor
Sherman L. Kiser
By W. M. Roach
Attorney Patented Mar. 26, 1935

1,995,308

UNITED STATES PATENT OFFICE 1,995,308

PLOTTING BOARD

Sherman L. Kiser, United States Army, Bippus, Ind.

Application October 8, 1932, Serial No. 636,881

2 Claims. (Cl. 35—25)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a plotting board for determining certain artillery firing data.

The device is intended primarily to afford a practical means of instruction in the computation of firing data where local conditions do not permit actual terrain exercises.

A preferred embodiment of the invention is illustrated in the accompanying drawings in which Fig. 1 is a plan of the chart.

Fig. 2 is a plan view of one half of the chart on which a problem is laid out.

Figs. 3, 4 and 5 are markers employed with the chart.

Fig. 6 is a perspective view illustrating the employment of the markers.

Figure 1:
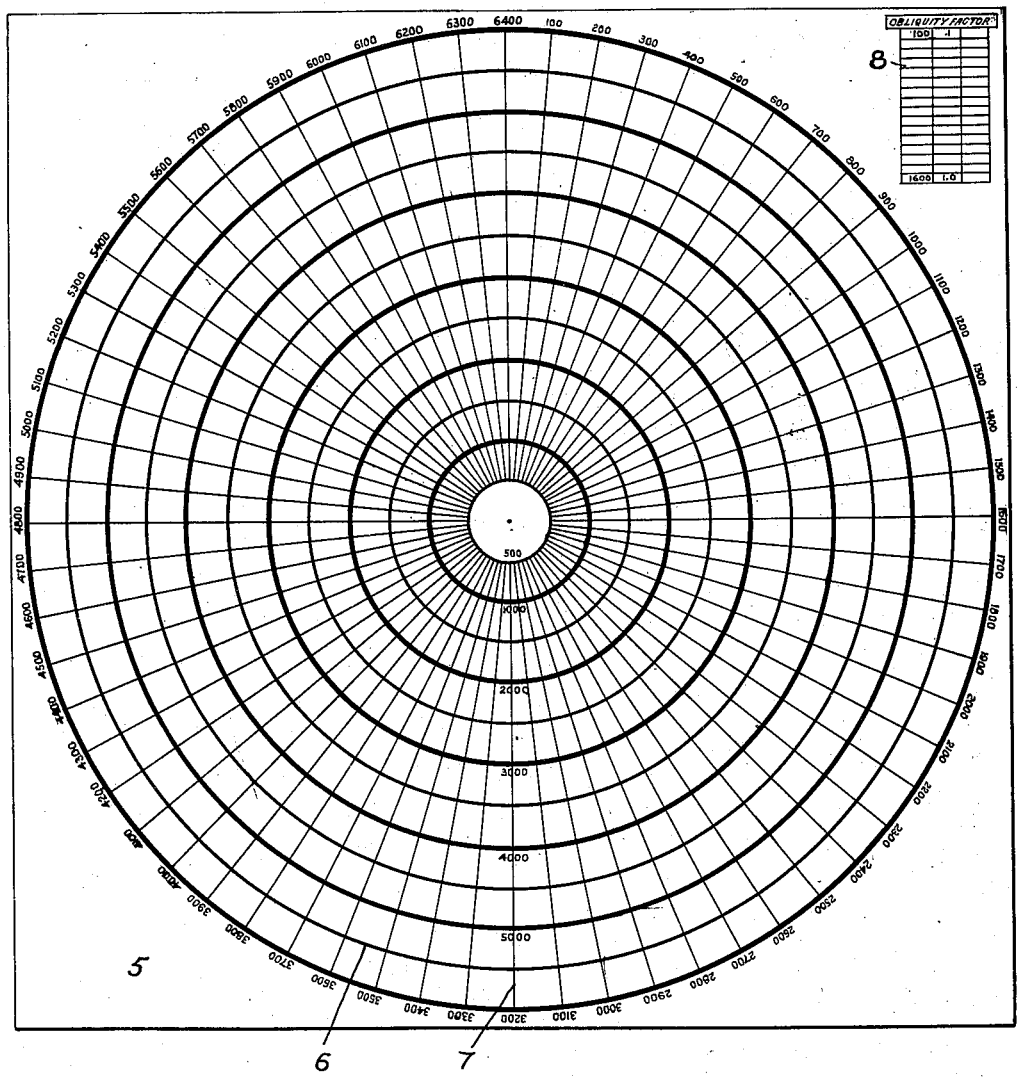

Referring to Fig. 1 the device comprises a base 5 on which is a chart consisting of concentric circles 6 marked in yards of range, and radial lines 7 marked in mils. On one corner of the base is a chart 8 of the natural cosines of the angles. A marker 9 shown in Fig. 3 is provided with annular grooves 10 to represent a mil scale of angle site having its zero reading in the center. A similar marker 11 has grooves 12 representing a mil scale of plus angle of site. A wire clip 13 such as a paper clip is engageable in the grooves of the pins or markers.

In the parallel method of calculating the firing angle, the angle from the target to the aiming point is measured clockwise at the observation post. By adding or subtracting from this angle, depending on the position of the aiming point relative to the gun the parallaxes at the target and aiming point for the base line observation post-gun, the value of the firing angle for the gun is obtained. If the target or aiming point are not near the normal to the base line the amount of the deviation must be taken into consideration in computing the parallax. This deviation from the normal is known as the change in parallax due to obliquity and the factors of obliquity are the natural functions of the angles.

The parallax is equal to the distance, observation post-gun divided by the range, in thousands of yards, gun-target or gun-aiming post and multiplied by the obliquity factor. The sign of the angle of parallax is determined by noting whether or not the offset at the target or aiming post falls within or without the measured angle taken at the observation post. If the offset is within or partly within the measured angle the parallax is subtractive and if without the angle it is additive.

Referring now to Fig. 2 the example to be worked out is as follows:

Target at 5000 yards from observation post on the 6400 mil line.

Gun at 2200 yards from observation post on the 1500 mil line.

Aiming point at 4000 yards from observation post on the 700 mil line.

These data are laid out on the chart using the center of the circle O as the observation post, and designating the target as T, the gun as G and the aiming point as P. A marker 9 (Fig. 3) is placed at the point G and another marker is placed at T while the points O and P may each be identified by an ordinary pin 14 as shown in Fig. 5. In order to calculate the parallaxes for T and P it is only necessary to estimate the ranges GT and GP, and when using cosines as obliquity factors to determine the deviations of the lines OT and OP from the normal to the base line OG. These deviations may be read from the mil scale 7 and the appropriate obliquity factor selected. The offsets TT' and PP' are respectively without and within the angle TOP. When the sines of the angles are used for obliquity factors the smaller angle of OT or OP with the base line OG is selected in determining parallax.

The angle of site from the observation post to the gun and target is supplied as part of the data. The clips 13 when moved to the designated grooves 10 of the markers 9 indicate the line of sight from gun to target. The student when supplied with the position of a mask or covering crest and the angle of site thereto from the observation post can mathematically determine the angle of site from gun to covering crest, and appropriately position the clip 13 on the marker 11. This layout will afford a visible demonstration of the problem of clearing a mask or covering crest.

The present plotting board facilitates the assignment of problems and affords a simple and convenient method of explaining and demonstrating the obliquity factor in all quadrants and the sign of the offset.

I claim:

1. In a plotting board for use in the parallel method of calculating firing data, a base, a chart on the base having concentric circles marked in terms of range and radiating angle lines marked in terms of mils, the center of the circle denoting the position of an observation post, markers adapted to be applied to the chart to denote the position of gun and target, said markers provided with annular grooves scaled in plus and minus terms of mils, a marker adapted to be applied to the chart between the gun and target markers to denote the position of a crest, said marker provided with annular grooves scaled in plus terms of mils, and members engageable in the grooves of the markers according to angle of site from the observation post.

2. In a plotting board for use in the parallel method of calculating firing data, a base, a chart on the base having concentric circles marked in terms of range and radiating angle lines marked in terms of mils, the center of the circle denoting the position of an observation post, markers adapted to be applied to the chart to denote the position of gun and target, said markers provided with annular grooves scaled in plus and minus terms of mils, and members engageable in the grooves of the markers according to angle of site from the observation post.

SHERMAN L. KISER.